United States Patent Office 3,584,047
Patented June 8, 1971

3,584,047
ALKYLHYDROXYPHENYL POLYAMIDES
Martin Dexter, Briarcliff Manor, John Denon Spivak, Spring Valley, and David Herbert Steinberg, Bronx, N.Y., assignors to Geigy Chemical Corporation, Ardsley, N.Y.
No Drawing. Filed Dec. 29, 1967, Ser. No. 694,370
Int. Cl. C07c 103/30
U.S. Cl. 260—559       12 Claims

ABSTRACT OF THE DISCLOSURE

Polyamides of alkylhydroxyphenylalkanoic acid and polyamines prepared by amidation procedures, are stabilizers of organic material otherwise subject to oxidative deterioration.

DETAILED DESCRIPTION

This invention pertains to polyamides derived from alkylhydroxyphenylalkanoic acids and polyamines and to compositions otherwise subject to oxidative deterioration stabilized by the incorporation therein of such amides.

In particular, the present invention relates to compounds having:

(a) from 2 to 4 amide units

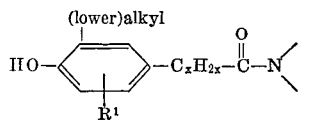

wherein $R^1$ is hydrogen or (lower) alkyl and $x$ has a value of from 0 to 6; and (b) (1.) one to three polyvalent hydrocarbon chains having a total of from 2 to 30 carbon atoms, one of the free valences of each of said amide units being satisfied by the free carbon atom valence of a polyvalent hydrocarbon chain and the other of the free nitrogen atom valences of said amide unit being satisfied by either a hydrogen atom or a free carbon atom valence of either the same or a second hydrocarbon chain, the total nitrogen atom valences of all said amide units not satisfied by hydrogen atoms being equal to the total free carbon atom valences on all said hydrocarbon units; (b) (2.) a tris(polymethylene)amine group of 6 to 18 carbon atoms, one of the free nitrogen atom valences of each of three of said amide units being satisfied by one of the three free carbon atom valences of said tris(polymethylene)amine and the other free nitrogen atom valence of each of said amide units being satisfied by a hydrogen atom; or (b) (3.) an N,N,N',N'-tetra(polymethylene)alkanediamine group of 10 to 30 carbon atoms, one of the free nitrogen atom valences of each of four of said amide units being satisfied by one of the four free carbon atom valences of said N,N,N',N'-tetrakis(polymethylene)alkanediamine and the other free nitrogen atom valence of each of said amide units being satisfied by a hydrogen atom.

By the term "alkyl" and derivations thereof employing the root "alk" such as "alkylene," is intended a group containing a branched or straight chain hydrocarbon chain of from 1 to 30 carbon atoms inclusively. Representative of such alkyl groups are thus methyl, ethyl, propyl, butyl, t-butyl, octyl, decyl, dodecyl, tetradecyl, octadecyl, eicosyl, and the like. When the term "alkyl" is herein qualified by the designation "(lower)," there is intended a branched or straight chain hydrocarbon group of from 1 to about 6 carbon atoms.

It will be observed in Formula I that the alkanoyl portion of these polyamides bears a (lower)alkyl-p-phenolic group. This phenolic group exhibits at least one (lower) alkyl group, in a position ortho to the hydroxy group. A second (lower)alkyl group ($R^1$) is optionally present either (a) in the other position ortho to the hydroxy group or (b) meta to the hydroxy group and para to the first (lower)alkyl group. Preferred are the di(lower)alkyl-p-phenolic groups, e.g., $R^1$ is (lower)alkyl, and although not so limited, the (lower)alkyl groups on the p-phenolic group are preferably branched groups such as t-butyl. Other arrangements, however, such as for example a 3-t-butyl-6-methyl-4-hydroxyphenyl or a 3,5- dimethyl-4-hydroxyphenyl group are included.

It will be appreciated from the foregoing description associated with Formula I that the polyamines from which the polyamides of the present invention are derived will contain at least two amine groups, each separated from another by at least one polyvalent hydrocarbon chain of at least 2 carbon atoms.

In a first embodiment of this invention, one of the free nitrogen atom valences of each of these amide units will bear a hydrogen atom while the second valence of each of these amide units will be satisfied by one of the carbon atom valences of the hydrocarbon chain. The hydrocarbon chain may have a straight or branched chain and be aliphatic or alicyclic. Representative of amides of this first embodiment are those derived from the alkylhydroxyphenylalkanoic acids and polyamines such as ethylenediamine, 1,3-diaminopropane, 1,6-diaminohexane, 1,10-diaminodecane, 1,1 - di(aminomethyl)-ethylamine, tetra-(aminomethyl)methane, 1,4 - diaminomethyl-cyclohexane, 1,4-diaminocyclohexane, 1,2-diaminocyclohexane, and the like. This first embodiment may thus be represented by the formula:

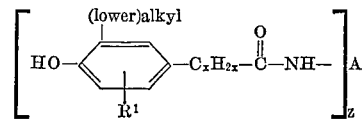

wherein $R^1$ and $x$ are as previously defined, $z$ has a value of from 2 to 4 and A is a polyvalent hydrocarbon chain having a valence equal to $z$.

In a second aspect of this first embodiment, while each of the nitrogen atom valences of at least two of the amide units will be satisfied by a single hydrogen atom and a single valence bond of two separate divalent hydrocarbon chains, a third or fourth amide unit will satisfy each of the remaining valences of the two or three divalent hydrocarbon chains. Representative of such compounds are the polyamides derived from the polyamines such as diethylene triamine, dipropylene triamine, N-(2-aminoethyl)-1,4-butanediamine, N-(2 - aminoethyl)-1,3-propanediamine, bis(2-aminopropyl)amine, triethylenetetraamine, and the like. This second aspect of the first embodiment may be represented by the formula

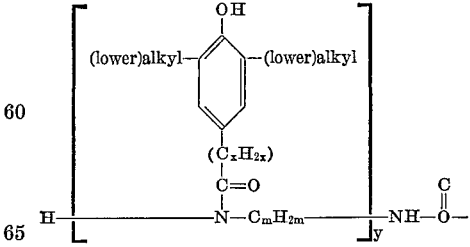

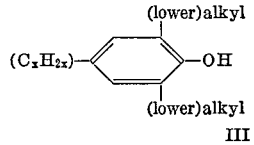

III wherein $R^1$ and $x$ are as previously defined and $y$ has a value of from 2 to 3 and $m$ has a value of 2 to 6.

As a third aspect of this first embodiment of the present invention, both of the free nitrogen atom valences of each of the amide units are bound to the same or different polyvalent hydrocarbon chain. The amines from which these amides of the first embodiment are derived are thus nitrogen-containing heterocyclics. When both valences of any given amide unit are bound to the same hydrocarbon chain, the chain will be branched and at least tetravalent, e.g., the tetravalent hydrocarbon chain 3,6-diethyleneoctamethylene, as is present in the diamide derived from 4,4'-dimethylene-dipiperidine. Alternatively, each of the two valence bonds of the amide unit may be bound to a different divalent hydrocarbon chain, e.g., two ethylene chains, as is found in the diamide derived from piperazine or one ethylene chain and one propylene chain as found in homopiperazine.

In a second embodiment of the present invention, the amide units are bound to polymethylene chains of tertiary amines. Thus in a first aspect of this second embodiment one free nitrogen atom valence of each of three amide units is satisfied by a free carbon atom valence of a tris(polymethylene)amine while the other free nitrogen atom valence is satisfied by hydrogen. Representative of the amines from which such polyamides are derived are those of N,N,N-tris - (2 - aminoethyl)amine and N,N,N-tris-(3-aminopropyl)amine. This first aspect of the second embodiment may thus be represented by the following formula:

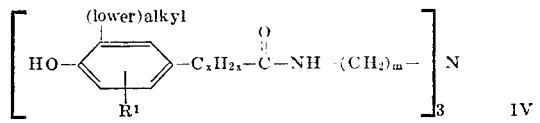

IV wherein $R^1$, $x$ and $m$ are as previously defined.

A second aspect of this second embodiment is represented by compounds in which one free nitrogen atom valence of each of four amide units is satisfied by one of the four free carbon atom valences of an N,N,N',N'-tetrakis(polymethylene)alkanediamine, the other nitrogen atom valence being satisfied by hydrogen. Representative of amines from which such polyamides are derived is N,N,N',N'-tetrakis(2-aminoethyl)ethylene diamine and this second aspect may thus be represented by the formula:

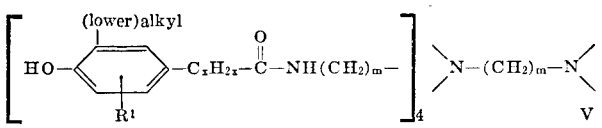

V wherein $R^1$, $x$ and $m$ are as previously defined.

While the foregoing amines from which these polyamides are derived can exist in the form of different stereoisomers, e.g., optical isomers and/or geometric isomers, this does not affect the properties of the final polyamides. Thus either a mixture of such isomers, or the separated isomers themselves, can be subjected to the procedures herein described without substantially altering the properties of the final polyamides obtained.

These alkylhydroxyphenylalkanoic acid amides of polyamines are stabilizers of organic material normally subject to oxidative deterioration as by light and/or heat. Materials which are thus stabilized according to the present invention include synthetic organic polymeric substances such as vinyl resins formed from the polymerization of vinyl halides or from the copolymerization of vinyl halides with unsaturated polymerizable compounds, e.g., vinyl esters, α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-olefins; polyurethanes such as are prepared from polyols and organic polyisocyanates; polyamides such as polyhexamethylene adipamide; poly-esters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and styrene and those formed by the copolymerization of acrylonitrile, butadiene and/or styrene. Other materials stabilized according to the present invention include lubricating oil of the aliphatic ester type, e.g., di-(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil and the like, hydrocarbon material such as gasoline both natural and synthetic diesel oil, mineral oil, fuel oil, drying oil, cutting fluids, waxes, resins and the like, fatty acids such as soaps and the like.

In general the stabilizers of this invention are employed from about 0.005% to about 10% by weight of the stabilized composition, although this will vary with the particular substrate. A particularly advantageous range is from about 0.1% to about 1%. The compounds are especially useful for the stabilization of polyamides and polycaprolactams. They may be added to the polymerization formulation and are highly effective in providing a polymer of the required molecular weight, as well as preventing discoloration and degradation during polymerization, subsequent processing and use. They may also be blended after polymerization or sprayed on the surface of films, fabrics, filaments or the like to provide effective stabilization.

These compounds can also be used in combination with other additives such as antioxidants, particularly sulfur-containing esters such as DSTDP, DLTDP and the like, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet stabilizers, dyes, pigments, metal chelating agents, dyesites and the like.

The compounds of the present invention can be prepared via a number of conventional amidation procedures. Thus an acid of the formula:

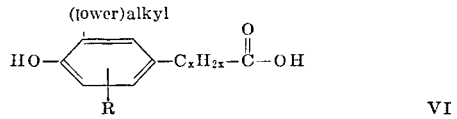

VI or an alkyl ester thereof and a polyamine are heated in an inert organic solvent with the generation of water or an alcohol. Alternatively the polyamine and the acid halide, generally the acid chloride, are allowed to react in an inert organic solvent, preferably in the presence of an organic or inorganic base which serves as an acid binding agent, with the generation of the corresponding acid halide.

The following examples will serve to further exemplify the nature of this invention but should not be construed as a limitation thereof.

EXAMPLE 1

A mixture of 128.6 g. of methyl 3-(3,5-di-t-butyl-4-hydroxyphenyl)propionate and 23.2 g. of 1,6-hexamethylenediamine are heated together with stirring under nitrogen for 3.5 hours at 150–155° C., the methanol which is evolved being separated in moisture trap. The temperature is then raised to 160–190° C. for 1.5 hours, the reaction going to about 86% completion. After a final heating at 200° C. for 2.5 hours at 5–10 mm. pressure, the mixture is cooled and dissolved in 550 ml. of benzene. The product 1,6-bis[3 - (3,5-di-t-butyl-4-hydroxyphenyl) propionamido]hexane solidifies, is collected by filtration and further purified through recrystallization from benzene, M.P. 154–156°. Repeated recrystallization from 2:3 benzene, M.P. 154–156°. Repeated recrystallization from 2:3 benzene:cyclohexane raises the melting point to 158–159° C.

This product is alternatively prepared through the reaction of 1,6-hexamethyldiamine with two molar equivalent amounts of 3-(3,5-di-t-butyl-4-hydroxyphenyl)propionyl chloride in the presence of an acid binding agent such as potassium carbonate.

In a like fashion by substituting esters such as methyl 3-(3-methyl-4-hydroxy-5-t-butylphenyl)-
propionate,
methyl 3-(3,5-di-methyl-4-hydroxyphenyl)propionate,
ethyl α-(3,5-di-t-butyl-4-hydroxyphenyl)isobutyrate,
methyl 3,5-di-t-butyl-4-hydroxyphenylacetate, and
ethyl 2-(3,5-di-t-butyl-4-hydroxyphenyl)propionate, all prepared for example according to the procedures of U.S. Patent No. 3,330,859, for methyl 3-(3,5-di-t-butyl-4-hydroxyphenyl)propionate in the initial procedure of this example, there are respectively obtained 1,6-bis[3-(3-methyl-4-hydroxy-5-t-butylphenyl)propion-
amido]hexane,
1,6-bis[3(3,5-dimethyl-4-hydroxyphenyl)propion-
amido]hexane,
1,6-bis[α-(3,5-di-t-butyl-4-hydroxyphenyl)isobutyr-
amido]hexane,
1,6-bis(3,5-di-t-butyl-4-hydroxyphenylacetamido)-
hexane and
1,6-bis[2-(3,5-di-t-butyl-4-hydroxyphenyl)propion-
amido]hexane.

Likewise, the following amines are substituted for 1,6-hexamethylenediamine for reaction in stoichiometric quantities with methyl 3-(3,5-di-t-butyl-4-hydroxyphenyl)propionate or analagous alkylhydroxyphenylalkanoates;

1,4-tetramethylenediamine;
1,10-decamethylenediamine;
1,12-dodecamethylenediamine;
1,8-octamethylenediamine;
1,5-pentamethylenediamine;
1,2-diaminopropane;

1,6-diamino-2,2-dimethylhexane and the like.

EXAMPLE 2

A solution of 23.75 g. (0.08 mole) of 3-(3,5-di-t-butyl-4-hydroxyphenyl)propionyl chloride in 250 ml. of dry benzene is added to a cooled (0 to +5° C.) solution consisting of 1.20 g. (0.02 mole) of ethylenediamine, 10.0 g. of potassium carbonate and 55 ml. of water. The reaction mixture is stirred for 15 hours while the temperature is allowed to attain room temperature (25° C.). 1,2-bis[3-(3,5-di-t-butyl-4-hydroxyphenyl)propionamido]-ethane separates as a white solid and is collected by filtration and recrystallized twice from benzene/chloroform, M.P. 215–216° C.

EXAMPLE 3

1,4-bis-aminomethylcyclohexane (14.23 g., 0.10 mole) and 64.33 g. (0.22 mole) of methyl 3-(3,5-di-t-butyl-4-hydroxyphenyl) propionate are mixed in a dry reaction vessel which has been preflushed with nitrogen, and stirred until homogeneous. Lithium hydride (98.4 mg.) is then added. The reaction is monitored by methanol evolution and by titration for the presence of unreacted amino groups. During a period of 15½ hours, the temperature is gradually raised from 125°/760 mm. to 195°/16 mm. The reaction mixture is cooled and dissolved in 400 ml. of chloroform. This solution is clarified and concentrated to 200 ml. The crystalline product, 1,4-bis[3-(3,5-di-t-butyl-4 - hydroxyphenyl)propionamidomethyl]cyclohexane, is collected by filtration, washed with benzene, air-dried and recrystallized from hot chloroform, M.P. 248–251° C.

By employing an equivalent amount of 1,4-diaminocyclohexane and 1,2-diaminocyclohexane, there are respectively obtained 1,4 - bis-[3-(3,5-di-t-butyl-4-hydroxyphenyl)propionamido]cyclohexane and 1,2-bis-[3-(3,5-di-t-butyl-4-hydroxyphenyl) propionamido]cyclohexane.

EXAMPLE 4

A solution of 28.0 g. (0.080 mole) of 3-(3,5-di-t-butyl-4-hydroxyphenyl)propionyl chloride in 200 ml. of dry benzene is added to a cooled solution containing 15.4 g. of potassium carbonate, and 3.28 g. (0.01 mole) of tetrakis(aminomethyl)methane dihydrogen sulfate salt in 75 ml. of water. The mixture is stirred and the temperature gradually allowed to reach room temperature (25° C.) over a 15 hour period. The mixture is then poured into ice-water and extracted exhaustively with ether. The ethereal extracts are washed with 2 N sulfuric acid, 5% sodium carbonate solution, water and saturated sodium chloride solution, dried over sodium sulfate and evaporated under reduced pressure. The product thus obtained, tetrakis[3 - (3,5 - di-t-butyl-4-hydroxyphenyl)propionamidomethyl]methane, is recrystallized from n-heptane, M.P. 132–134° C.

EXAMPLE 5

3-(3,5-di-t-butyl-4 - hydroxyphenyl)propionyl chloride (29.7 g.) is added in portions to a cooled (0 to +5° C.) solution of 6.30 g. (0.03 mole) of 1,3-di-(4-piperidyl)-propane in 100 ml. of dry pyridine. The temperature of the reaction mixture is gradually allowed to reach room temperature while stirring for about 15 hours, and the reaction mixture is then heated at 50° C. for about 20 hours and then poured into 1 l. of ice water. The crude product separates and is dissolved in ether and washed successively with water, 2 N sulfuric acid, 6% sodium carbonate solution, and finally water until the washings are neutral. The solution is then dried over anhydrous sodium sulfate and the solvent is removed by distillation. The solid is collected by filtration and recrystallized twice from cyclohexane/benzene to yield 1,3 - bis{N-[3-(3,5-di-t-butyl-4-hydroxyphenyl)-propionyl]piperid - 4-yl}-propane, M.P. 141–151° C.

EXAMPLE 6

A solution of 35.63 g. of 3-(3,5-di-t-butyl-4-hydroxyphenyl)propionyl chloride in 200 ml. of dry benzene is added to a cooled (0 to +5° C.) solution of 2.58 g. of piperazine and 15.4 g. of potassium carbonate in 75 ml. of water. The mixture is stirred for about 15 hours, allowing the temperature to reach room temperature (25° C.). The reaction mixture is extracted with ethylene dichloride and these extracts are washed with water, dried over sodium carbonate and evaporated to dryness. The solid is washed with hot benzene to yield N,N'-bis[3-(3,5-di-t-butyl - 4 - hydroxyphenyl)propionyl]piperazine, M.P. 205–207° C.

EXAMPLE 7

To a solution of 1.55 g. of diethylene triamine and 11 g. of potassium carbonate in 16 ml. of water, cooled to 0–5° C. is added in a dropwise fashion with stirring over a 30 minute period, a solution of 26.72 g. of 3-(3,5-di-t-butyl-4-hydroxyphenyl)propionyl chloride in 250 ml. of benzene. The mixture is stirred for approximately 15 hours, the temperature being allowed to reach 20–25° C. The organic phase is then separated, washed twice with water and once with saturated sodium chloride solution, dried and evaporated under reduced pressure. The product is triturated several times with cyclohexane and heptane and then chromatographed on alumina, eluting with 1:1 benzene/chloroform. The fractions demonstrating a melting point of from 86–120° C. are combined and recrystallized from benzene to yield N,N',N''-tris[3-(3,5-di-t-butyl - 4 - hydroxyphenyl)propionyl]diethylene triamine.

In a similar fashion the following amines are reacted with 3 - (3,5 - di - t - butyl - 4 - hydroxyphenyl(propionyl chloride:

triethylene tetraamine,
N,N,N',N'-tetrakis(2-aminoethyl)ethylenediamine,
bis-(2-aminopropyl)amine,
N-(2-aminoethyl)-1,4-butanediamine,
N-(2-aminoethyl)-1,3-propanediamine,
N,N,N-bis(2-aminoethyl)amine, and the like to yield respectively N,N',N'',N'''-tetrakis[3-(3,5-di-t-butyl-4-hydroxyphenyl) propionyl]triethylene tetraamine;
N,N,N',N'-tetrakis{2-[3-(3,5-di-t-butyl-4-hydroxyphenyl) propionamido]ethyl}ethylenediamine;
N,N',N''-tris[3-(3,5-di-t-butyl-4-hydroxyphenyl) propionyl]dipropylene triamine;
N,N',N''-tris[3-(3,5-di-t-butyl-4-hydroxyphenyl) propinoyl]-1-(2-aminoethylamino)-4-aminobutane;
N,N'N'' - tris[3 - (3,5 - di - t - butyl - 4 - hydroxyphenyl) propionyl] - 1 - (2 - aminoethylamino) - 3 - aminopropane and N,N,N, - tris{2 - [3 - (3,5 - di - t - butyl - 4 - hydroxyphenyl)propionamido]ethyl}amine.

Analogous polyamides are obtained through the substitution of other alkylhydroxyphenylalkanoyl chlorides such as 3-(3,5-dimethyl-4-hydroxyphenyl)propionyl chloride and 3,5-di-t-butyl-4-hydroxyphenylacetyl chloride.

EXAMPLE 8

Unstabilized polypropylene powder (Hercules Profax 6501) is thoroughly blended with 0.5% by weight of stabilizer. The blended material is then milled on a two roller mill at 182° for 10 minutes after which time the stabilized polypropylene is sheeted from the mill and allowed to cool.

The milled polypropylene sheet is then cut into small pieces a ndpressed for 7 minutes on a hydraulic press at 218° and 2000 pounds per square inch pressure. The resultant sheet of 25 mil thickness is tested for resistance to accelerated aging in a forced draft oven at 149° C. As is evident from the table below, the composition of 0.5% by weight of stabilizer and polypropylene is stabilized against oxidative deterioration

| | Hrs. |
|---|---|
| Polypropylene alone | 3 |
| 1,4 - bis[3 - (3,5 - di - t - butyl - 4 - hydroxyphenyl) propionamidomethyl]cyclohexane | 1340 |
| Tetrakis[3 - (3,5 - di - t -butyl - 4 - hydroxyphenyl) propionamidomethyl]methane | 998 |
| 1,3 - bis{N - [3,5 - di - t - butyl - 4 - hydroxyphenyl]piperid - 4 - yl}propane | 711 |
| N,N' - bis[3 - (3,5 - di - t - butyl - 4 - hydroxyphenyl)propionyl]piperazine | 1285 |
| 1,2 - bis[3 - (3,5 - di - t - butyl - 4 - hydroxyphenyl)propionamido]ethane | 980 |
| 1,6 - bis[3 - (3,5 - di - t - butyl - 4 - hydroxyphenyl)propionamido]hexane | 380 |
| N,N',N'' - tris - [3 - (3,5 - di - t - butyl - 4 - hydroxyphenyl)propionyl]diethylene triamine | 325 |

All the above samples also showed excellent stability in the Fade-Ometer evaluation.

EXAMPLE 9

A stabilized mineral oil composition is prepared by incorporating into a refined mineral oil of 183 S.U.S. at 100° F. (Regal Oil B, Texas Company) 0.005% by weight of 1,6-bis[3-(3-methyl-4-hydroxy-5-t-butylphenyl) propionamido]hexane.

EXAMPLE 10

Stabilized lard is prepared by incorporating in lard 0.01% by weight of 1,2-bis[3-(3,5-di-t-butyl-4-hydroxyphenyl)propionamido]ethane. The lard, with and without stabilizer, is tested by the oxygen induction period method (ASTM D525–55) with the following changes: 15 parts of lard sample are tested; the end point is defined as the mid-point of the first hour in which a pressure drop of 2 lbs. per square inch or greater is noted, followed by an equivalent of greater drop in the succeeding hour. The unstabilized lard fails after 108 minutes.

Stabilized cotton seed oil is prepared when 0.01% by weight of this stabilizer is incorporated in a refined cotton seed oil. The unstabilized oil fails after 282 minutes.

EXAMPLE 11

Stabilized gasoline is prepared by incorporating into gasoline having no additives and no stabilizers therein, 0.05% by weight of 1,4-bis[3-(3,5-di-t-butyl-4-hydroxyphenyl)propionamidomethyl]cyclohexane. The gasoline, with and without stabilizer is tested by the oxygen bomb induction period method (ASTM D525–55), with the result that the gasoline with stabilizer does not fail after 425 minutes, while the blank fails after 250 minutes.

EXAMPLE 12

Paraffin wax (M.P. 125–128° F.) is stabilized by incorporating therein 0.001% by weight of tetrakis [3-(3,5-di-t-butyl - 4 - hydroxpyhenyl)propionamidomethyl] methane. The effective stabilization thereby is illustrated by the following test. The paraffin wax with stabilizer is heated for 18 hours at 121° in the presence of air: Unstabilized wax is also heated in like manner. After 18 hours there is no perceptible odor for the stabilized wax. The unstabilized wax, however, exhibits a distinct odor.

EXAMPLE 13

A stabilized high temperature lubricating oil is prepared by incorporating 2% by weight of N,N'-bis[3-(3,5-di-t-butyl-4-hydroxyphenyl)propionyl]piperazine into the lubricant, which comprises diisoamyladipate. The stabilized composition is compared with the unstabilized lubricant by heating at 175° in the presence of air and metallic catalysts according to the test method described in Military Specification Mil–L–7808c. After 72 hours the blank contains 83% sludge and has increased very greatly in viscosity. The stabilized lubricant, however, is very slightly less viscous than originally and contains less sludge.

EXAMPLE 14

High impact polystyrene resin containing elastomer (i.e., butadiene-styrene) is stabilized against loss of elongation properties by incorporation of 0.5% by weight of N,N,N - tris{2 - [3 - (3,5-di-t-butyl-4-hydroxyphenyl) propionamido]}amine. Under the test conditions described below, the stabilized resin retains a higher percentage of its original elongation properties, whereas the unstabilized resin retains less elongation properties.

The unstabilized resin is dissolved in chloroform and and the stabilizer then added, after which the mixture is cast on a glass plate and the solvent evaporated to yield a uniform film which, upon drying, is removed and cut up, and then pressed for 7 minutes at a temperature of 163° and a pressure of 2000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° and thereafter tested for elongation.

Similar results are obtained with a terpolymer of acrylonitrile-butadiene-styrene.

EXAMPLE 15

A mixture of 1 kilogram of polyoxymethylene diacetate (molecular weight of about 30,000), 5 g. of N,N',N'-tris [3 - (3,5-di-t-butyl-4-hydroxyphenyl)propionyl]diethylene triamine and 2 g. of dicyandiamide are extruded at 220°

C. Upon exposure to prolonged heating at 230° C., deterioration, as measured by weight loss, is significantly less for this composition than for a composition identical, but for the absence of the stabilizer.

EXAMPLE 16

A mixture of 1 M nylon 6,6 salt (hexamethylene diamine adipate) 0.01 M hexamethylene diamine and 1% by weight of 1,6 - bis[3-(3,5-dimethyl-4-hydroxyphenyl)propionamido]hexane are added to a polymerization tube and heated for one hour at 220° C. and atmospheric pressure. The temperature is then raised to 285° C. and the pressure reduced slowly to 1 mm. The tube is maintained under these conditions for 30 minutes, cooled and flushed with nitrogen.

The thus stabilized polyhexamethylene adipate shows less color development and weight loss after heating at 140° C. in a forced air oven for 65 hours than does an unstabilized sample.

What is claimed is:

1. A compound of the formula:

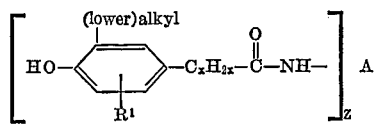

wherein

R¹ is hydrogen or lower alkyl;
x has a value of from 1 to 3;
z, a cyclohexylene radical in which case z is 2 or a
A is a saturated aliphatic hydrocarbon chain containing up to 13 carbon atoms and having a valence equal to z, a cyclohexylene radical in which case z is 2 or a dimethylenecyclohexane radical in which case z is 2.

2. The compound according to claim 1 which is 1,6-bis[3 - (3,5 - di - t - butyl - 4 - hydroxyphenyl)propionamido]ethane.

3. The compound according to claim 1 wherein the compound is 1,2-bis[3-(3,5-di-t-butyl-4-hydroxyphenyl)-propionamido]ethane.

4. The compound according to claim 1 wherein the compound is 1,3-bis[3-(3,5-di-t-butyl-4-hydroxyphenyl)-propionamido]propane.

5. The compound according to claim 1 wherein the compound is 1,4 - bis[3-(3,5-di-t-butyl-4-hydroxyphenyl)-propionamidomethyl]cyclohexane.

6. The compound according to claim 1 wherein the compound is tetrakis[3-(3,5-di-t-butyl-4-hydroxyphenyl)propionamidomethyl]methane.

7. A compound of the formula:

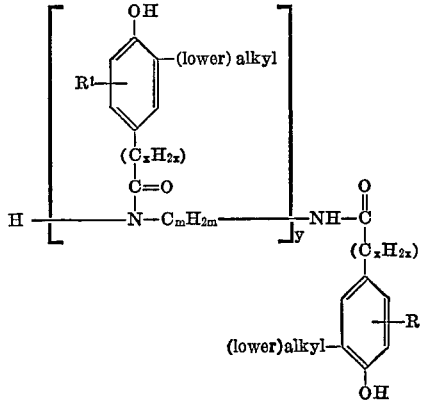

wherein

R¹ is hydrogen or (lower) alkyl;
x has a value of from 1 to 3;
m has a value of from 2 to 6; and
y has a value of from 2 to 3.

8. The compound according to claim 7 which is N,N′,N″-tris[3,5 - di _ t-butyl-4-hydroxyphenyl)propionyl]diethylene triamine.

9. A compound of the formula

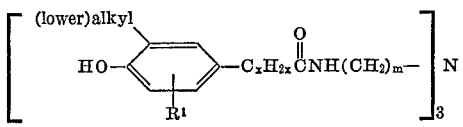

wherein

R¹ is hydrogen or (lower) alkyl;
x has a value of from 1 to 3; and
m has a value of from 2 to 6.

10. The compound according to claim 9 which is N,N,N-tris{2 - [3 - (3,5-di-t-butyl-4-hydroxyphenyl)propionamido]ethyl}amine.

11. A compound of the formula

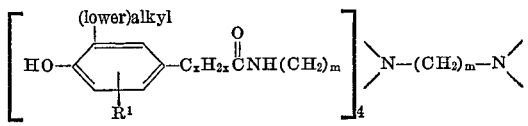

wherein

R¹ is hydrogen or (lower) alkyl;
x has a value of from 1 to 3;
m has a value of from 2 to 6

12. The compound according to claim 11 which is N,N′,N″,N‴-tetrakis 2-[3-(3,5-di-t-butyl - 4 - hydroxyphenyl)propionamido]ethyl]ethylene diamine.

References Cited

UNITED STATES PATENTS

| | | | |
|---|---|---|---|
| 3,282,939 | 11/1966 | Spivack et al. | 260—559 |
| 1,899,856 | 8/1933 | de Montmollin et al. | 260—559 |

HENRY R. JILES, Primary Examiner

H. I. MOATZ, Assistant Examiner

U.S. Cl. X.R.

252—403; 260—45.8, 45.9, 268, 294

UNITED STATES PATENT OFFICE
CERTIFICATE OF CORRECTION

Patent No. 3,584,047                    Dated June 8, 1971

Inventor(s) Martin Dexter et al.

It is certified that error appears in the above-identified patent and that said Letters Patent are hereby corrected as shown below:

Column 2 line 65 - that portion of the formula

Column 3, line 73 - "poly-olefins" should read -- poly-α-olefins --.

Column 4, lines 74-75 - "Repeated recrystallizations from 2:3 benzene, M.P. 154-156°." should be omitted.

Column 8 line 51 - "propionamido]}amine" should read -- propionamido]ethyl}amine --.

Column 9 Claim 1 "z, a cyclohexylene radical in which case z is 2 or a" should read -- z, has a value of from 2 to 4 inclusively; and --.

Column 9 claim 2 - "propionamido]ethane" should read -- propionamido]hexane --.

Column 9 Claim 7 - 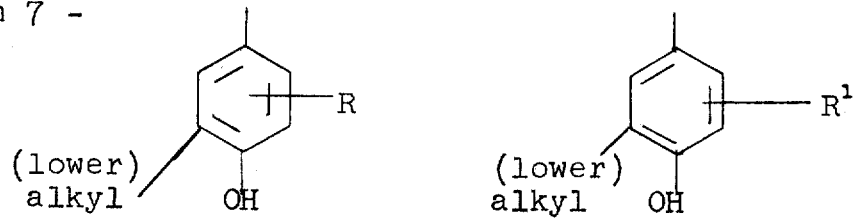

Signed and sealed this 28th day of March 1972.

(SEAL)
Attest:

EDWARD M. FLETCHER, JR.           ROBERT GOTTSCHALK
Attesting Officer                 Commissioner of Patents